United States Patent Office 3,156,649
Patented Nov. 10, 1964

3,156,649
FUNCTIONAL FLUIDS CONTAINING THIO-
CARBOXYLATE ESTERS
William A. Hewett, Oakland, and George M. Calhoun,
Berkeley, Calif., assignors to Shell Oil Company, New
York, N.Y., a corporation of Delaware
No Drawing. Filed Apr. 25, 1960, Ser. No. 24,206
8 Claims. (Cl. 252—48.6)

This invention relates to improved functional organic compositions. More particularly, the invention relates to oleaginous materials such as lubricants containing a novel additive.

In general functional organic fluids such as lubricants, fuels, hydraulic fluids and the like are doped with various soluble antioxidants, e.g. alkyl phenols or aromatic amines; detergents and corrosion inhibitors such as organic salts, e.g. metal carboxylates, phenates, phosphates, sulfonates and thiocarbamates; antiwear and extreme pressure agents such as sulfur-, chlorine- and/or phosphorous-containing compounds, e.g. organic phosphites, phosphates, phosphonates, sulfurized fatty materials, sulfurized oleic acid or sperm oil, chlorinated paraffin wax, etc. However, many of these compounds break down when used in organic liquids such as hydrocarbon fuels and oils when subjected to severe temperature and pressure conditions, and rapidly deteriorate and fail to impart their expected desired properties.

It has now been found that the effectiveness of functional organic fluids is substantially improved, particularly with respect to stability, detergency and wear inhibition, by addition thereto of a minor amount of an oil-soluble polypolar containing compound at least one of the polar groups being a thiolcarboxylate ester, hereinafter called thiocarboxylate, preferably containing at least two thiocarboxylate ester groups

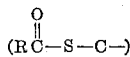

The R of the thiocarboxylate group

is an organic radical such as a hydrocarbyl or a polar-substituted hydrocarbyl radical, such as $C_{1-18}$ alkyl, aralkyl, alkylaryl or cyclo alkyl radicals or polar derivatives thereof such as halo, amino substituted hydrocarbyl radicals. The

unit is attached directly through the sulfur to a carbon atom of an organic compound which may be otherwise a hydrocarbon or a polar-containing hydrocarbon. When more than one thiocarboxyl unit,

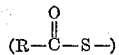

is present in a compound of this invention they are attached to different carbon atoms of the molecule and they may be uniformly or randomly distributed throughout the molecule and the number of such units may vary from 1 to 800, preferably from 1 to 600. Some of the thiocarboxylate esters are new compounds, particularly those derived from polymeric materials of high molecular weight and having substantial unsaturation of unsaturated polar-containing compounds such as unsaturated fatty acids, alcohols, esters, amides, etc.

The thiocarboxylate esters can be prepared by reacting a thiocarboxylic acid

wherein R is as defined above, with polyenes or polar-containing unsaturated compounds such as unsaturated organic acids, esters, ethers, sulfides, halogen or amino unsaturated compounds or the like polymeric form. The reaction conditions are not critical and those described by Koenig et al., JACS 79, 362 (1957), or Fitzgerald, J. Org. Chem. 22, 197 (1957), can be employed and generally comprise reacting the reactants at temperatures ranging from room temperature to about 50° C., in the presence of a free radical catalyst such as azo or peroxide catalysts or ultraviolet light and a non-reactive solvent such as benzene, toluene, xylene or the like.

Thiocarboxylic acids (R—COSH) which may be used include $C_{1-18}$ alkyl thiocarboxylic acids, $C_{1-18}$ aralkyl thiocarboxylic acids, $C_{1-18}$ alkaryl thiocarboxylic acids, cycloalkyl thiocarboxylic acid, chloroalkyl thiocarboxylic acids such as thioacetic acid, thiopropionic acid, thiobutyric acid, thiolauric acid, thiostearic acid, thiooleic acid, thioricinoleic acid, thiophenyl acetic acid, thiobenzylacetic acid, $C_{1-18}$ alkyl thiosalicyclic acid, $C_{1-18}$ alkyl thiobenzoic acid, thiocyclohexyl carboxylic acid, mono-, di- and trichloro thioacetic, thiopropionic or thiobutyric acids, and the like.

The unsaturated compounds which are reacted with the above thiocarboxylic acids to form the thiocarboxylates include, inter alia, (a) polyolefins and copolymers of a diolefin having from about four through six carbon atoms, e.g. pentadienes, isoprene, cyclopentadiene, hexadienes, biallyl, cyclohexadiene, and polymers thereof, (b) long-chain alpha-unsaturated hydrocarbons such as decene-1, dodecene-1, and octadecene-1 or copolymer of, for example, biallyl and dodecene-1, or (c) unsaturated polar-containing compounds such as unsaturated polymerizable esters, ethers, thioethers or amides such as vinyl decanoate, vinyl laurate, vinyl tridecanoate, vinyl myristate, vinyl pentadecanoate, vinyl palmitate, vinyl margarate, vinyl stearate, vinyl nonadecanoate, vinyl arachidate, vinyl behenate, vinyl 4,5,6-trimethyldodecanoate, vinyl 6,8,0-triethyl tridecanoate, vinyl 12-hydroxystearate, vinyl 9,10-dihydroxystearate, vinyl chlorostearate, vinyl cyanostearate, vinyl acetylstearate, vinyl dodecyl ether or thioether, vinyl tridecyl ether or thioether, vinyl tetracosyl ether or thioether, vinyl hexacosyl ether, biallyl ether, allyl stearate, allyl dodecyl ether, N-lauryl methacrylamide, N-stearyl methacrylamide, and N,N-distearyl methacrylamide or copolymers of (c) with (a) or (b) such as copolymer of vinyl stearate and biallyl or copolymer of vinyl laurate and cyclopentadiene, etc.

When copolymers are used to react with a thioacid to form polythiocarboxylates as for example copolymers formed by reacting a polyene of (a) with any of the polymerizable compounds of (b) and/or (c) the mol ratio of the polyene hydrocarbons to the polymerizable monomer compounds of (b) or (c) can be varied within relatively wide limits, e.g., from 1/10 to 10/1, preferably from 1/5 to 5/1, respectively. The polymer (prior to treatment with thioacid compound) should have a substantial amount of unsaturation and have a molecular weight of at least 500 and may be up to or over 2½ million, but preferably from about 2,000 to about 800,000 and still more preferred molecular weight range is from 100,000 to 600,000.

Depending on the monomers used, the polymers can be prepared thermally or in the presence of a suitable catalyst. Thus, with monomers such as butadiene, or isoprene and long-chain alpha-olefins such as alphadodecene or alpha-octadecene, the so-called Ziegler catalysts are preferred, such as combinations of aluminum trialkyl and a variable valence metal compound, e.g., titanium tetrachloride. In the formation of other types of oil soluble polymers, such as copolymers of a polyene (e.g. butadiene or isoprene) with lauryl methacrylate or with vinyl stearate or with N-lauryl methacrylamide, oxygen-yielding catalysts are preferred such as, for example, various organic peroxides, including aliphatic, aromatic, heterocyclic and acyl peroxides, such as diethyl peroxide, tertiary butyl hydroperoxide, dibenzoyl peroxide, dimethylthienyl peroxide, dicyclohexyl peroxide, dilauroyl peroxide and urea peroxide. These are mentioned by way of non-limiting examples of suitable organic peroxides. Other catalysts include sodium bisulfite, diethyl sulfoxide, ammonium persulfate, alkali metal perborates, azo compounds, such as alpha,alpha-azodiisobutyronitrile, etc.

The following examples illustrate the preparation of compounds of this invention.

EXAMPLE I

A copolymer of 1-octadecene (0.66 mole), 1-dodecene (1.33 moles) and isoprene (0.5 mole) was prepared in the presence of a Ziegler catalyst, $(C_2H_5)_3Al \cdot TiCl_4$, at room temperature for 24 hours. The copolymer had a molecular weight of 300,000 and an average of 750 double bonds per polymer molecule as shown by bromine number. This copolymer was reacted with about 20% excess of thioacetic acid in the presence of tert-butyl hydroperoxide for 2–4 hours at about 40° C. in benzene. The reaction mixture was diluted with diethyl ether, water washed, filtered and dried, followed by solvent removal. The analysis of the resulting polythioacetate having from 800 thioacetate units was as follows:

| | |
|---|---|
| Percent C | 75.1 |
| Percent H | 12.3 |
| Percent O | 4.41 |
| Percent S | 7.2 |
| Equivalent weight: | |
| On S | 446 |
| On O | 373 |

The product is oil-soluble and possesses good extreme pressure properties.

The thiocarboxylates of this invention in general are oil-soluble. They may be used as additives in petroleum fractions such as lubricating oils, fuel oils, light hydrocarbons such as aromatic solvents, kerosene and gasoline in amounts of from about 0.01% to about 10%, preferably from about 0.1% to about 5% by weight.

When the thiocarboxylates are used in lube oil compositions small amounts (0.1–25%) of a branched-chain alcohol, such as the so-called "Oxo" alcohols having from 3 to 8 carbon atoms, high molecular weight fatty acids such as $C_{8-18}$ fatty acids, e.g. lauric, stearic or oleic acids, or certain esters such as glycol monooleate, pentaerythritol mono- or dioleate, sorbitol monolaurate, etc. may be added for additional beneficial results.

The thiocarboxylates are useful in various synthetic oils and natural oils. Particularly useful hydrocarbon oils are those having a viscosity range of from 50 SUS at 100° F. to 250 SUS at 210° F. (SAE viscosity number ranging from SAE 5W to SAE 90). The natural hydrocarbon oils are obtainable from paraffinic, naphthenic, asphaltic or mixed base crudes. Useful synthetic oils include hydrocarbons and non-hydrocarbons, such as polymerized olefins, alkylated aromatics, isomerized waxes, copolymers of alkylene glycols and alkylene oxide (Ucon fluid, U.S. 2,425,755, 2,425,845 and 2,774,733) organic polyesters, such as esters of an aliphatic dibasic acid and a monohydric alcohol, such as di-2-ethyl hexyl sebacate or di-2-ethyl hexyl adipate, esters of polyhydric alcohols and monocarboxylic acids, such as pentaerythritol tetracaproate, and the like. Useful Ucon fluids are Ucon 50HB170, Ucon 50HB660 or Ucon LB550X, which are copolymers of ethylene and 1,2-propylene oxides; the diols as well as their mono- and dialkyl ethers are useful. The hydrocarbon oils may be blended with fixed oils such as castor oil, lard oil and the like and/or synthetic oils as mentioned or silicone polymers and the like.

To illustrate the manner in which the invention may be carried out, the following examples are given. Unless otherwise specified, parts disclosed are parts by weight.

The test runs were made on a conventional type Spur-Gear Machine on the following composition: Composition C (SAE 90 mineral oil+3% Example I additive).

The Spur-Gear Machine consists essentially of two

*Table 1*

| Example | Catalyst | Temperature, °C. | Polyene/Oil-Soluble Monoolefins Ratio | Mol Wt.[1] | Bromine No. |
|---|---|---|---|---|---|
| II | Ziegler Cat | Room temp | Butadiene (2)/octadecene-1 (1) | 400,000 | 90 |
| III | do | 60–70 | Cyclopentadiene (1)/isoprene (2)/octadecene-1 (1) | 250,000 | 80 |
| IV | Benzoyl peroxide | 80 | Isoprene (3)/lauryl methacrylate (1) | 5,000 | 50 |
| V | do | 110 | Butadiene (2)/cyclopentadiene (1) vinyl stearate (1) | 5,000 | 40 |
| VI | Ditert-butyl peroxide | 80 | Pentadiene (3)/N'-lauryl-methacrylamide (1) | 3,000 | 45 |
| VII | do | 120 | Isoprene (3)/lauryl methacrylate (1) stearylmethacrylate (1) | 8,000 | 33 |
| VIII | do | 100 | Isoprene (3)/allyl stearate (1) | 2,000 | 45 |

[1] Mol wt. determined by light scattering technique described in Chem. Rev. Vol. 40, p. 139 (1948).

*Table II*

| Example | Polymer | Functional Group Introduced | Catalyst | Temperature, °C. | Percent S in Polymer |
|---|---|---|---|---|---|
| D | Ex. II | Thioacetic acid | Benzoyl peroxide | 40–45 | 6–7 |
| E | Ex. III | Thiobutyric acid | do | 40–45 | 6–7 |
| F | Ex. IV | Thiostearic acid | Tert-butylperoxide | 50–60 | 5–5.5 |
| G | Ex. V | Thiobenzoic acid | do | 50–60 | 2 |
| H | Ex. VI | Thiocyclohexylcarboxylic acid | do | 50–60 | 2 |
| I | Ex. VII | $C_{1-18}$ alkyl thiosalicylic acid | Benzoyl peroxide | 50–60 | 3–4 |
| J | Ex. VIII | Thiocinnamic acid | do | 50–60 | 1 | geometrically similar pairs of gears connected by two parallel shafts. The gear pairs are placed in separate gear boxes, which also contain the supporting ball bearings. One of the shafts consists of two sections connected by a coupling. Loading is accomplished by blocking one side of the coupling and applying torque to the other. The conditions of the test were:

Speed ---------------------------------- r.p.m.-- 3200
Oil temperatures ----------------------- ° F.-- 100
Oil flow-rate -------------------------- cc./sec.-- 10
Load of 700 lbs. per inch in increments of 5 min. at each setting.

Composition C carried score loads of from 1,400 to 8,000 lbs./in. On the other hand, samples of the 1010 mineral oil containing separately 2% of the polymers of Examples II to VIII (Table I) which do not have the thiocarboxylate unit in the molecule carried score loads of about 700 lbs./in. and neat 1010 mineral oil carried a score load of 600.

The thiocarboxylates of this invention are useful also for providing superior load-carrying properties in lubricating oils which contain minor amounts of other agents which are non-reactive with the polymer, such as silicone antifoaming agents, alkylphenol antioxidants, polyacrylate ester viscosity-index improvers, and the like.

The thiocarboxylate compounds of this invention can be used to improve other types of compositions such as fuel oils, greases and hydraulic fluids.

We claim as our invention:

1. A mineral oil composition comprising a major amount of mineral oil and from about 0.1% to about 5% of a polythioacetate derivative of a copolymer of a diolefin having from about four through six carbon atoms and an alpha-monoolefin wherein the copolymer has a molecular weight of at least 5,000.

2. A mineral oil composition comprising a major amount of mineral oil and from about 0.1 to about 5% of an oil-soluble polythiocarboxylate derivative of an unconjugated olefinic polymer, wherein the polymer has a molecular weight of from about 500 to about 2½ million and each thiocarboxylate group of said derivative has the formula

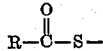

wherein R is an organic radical having about 1 to 18 carbon atoms.

3. A mineral oil composition comprising a major amount of mineral oil and from about 0.1% to about 5% of an oil-soluble polythiocarboxylate derivative of a copolymer of an alpha monoolefin and a diolefin having from about four through six carbon atoms, wherein the copolymer has a molecular weight of from about 2,000 to about 800,000 and each thiocarboxylate group of said derivative has the formula

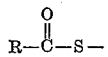

wherein R is an organic radical having about 1 to 18 carbon atoms.

4. A mineral oil composition comprising a major amount of mineral oil and from about 0.1% to about 5% of an oil-soluble polythiocarboxylate derivative of a copolymer of a diolefin having from about four through six carbon atoms and a polymerizable unsaturated carboxylate ester wherein the copolymer has a molecular weight of from about 2,000 to about 800,000 and each thiocarboxylate group of said derivative has the formula

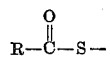

wherein R is an organic radical having about 1 to 18 carbon atoms.

5. A mineral oil composition comprising a major amount of mineral oil and from about 0.1% to about 5% of an oil-soluble polythioaccetate derivative of a copolymer of 1-octadecene, 1-dodecene and isoprene, wherein the copolymer has a molecular weight of from about 100,000 to about 600,000.

6. A mineral oil composition comprising a major amount of mineral oil and from about 0.1% to about 5% of an oil-soluble polythioacetate derivative of a copolymer of isoprene and lauryl methacrylate wherein the copolymer has a molecular weight of about 5000.

7. A mineral oil composition comprising a major amount of mineral oil and from about 0.1% to 5% of an oil-soluble polythioacetate derivative of a copolymer of isoprene and cyclopentadiene and 1-octadecene wherein the copolymer has a molecular weight of about 250,000.

8. A mineral oil composition comprising a major amount of mineral oil and from about 0.1% to 5% of an oil-soluble polythioacetate derivative of a copolymer of butadiene and 1-octadecene wherein the copolymer has a molecular weight of about 400,000.

References Cited in the file of this patent

UNITED STATES PATENTS

| Number | Name | Date |
|---|---|---|
| 2,212,895 | Allen | Aug. 27, 1940 |
| 2,390,491 | Bennett et al. | Dec. 11, 1945 |
| 2,402,560 | Langkammerer | June 25, 1946 |
| 2,427,501 | Kleinholz | Sept. 16, 1947 |
| 2,454,108 | Walling | Nov. 16, 1948 |
| 2,476,166 | Wayo | July 12, 1949 |
| 2,540,570 | Syphers | Feb. 6, 1951 |
| 2,626,279 | Crouch et al. | Jan. 20, 1953 |
| 2,632,735 | Hawley | Mar. 24, 1953 |
| 2,673,839 | Kirshenbaum et al. | Mar. 30, 1954 |
| 3,033,790 | Nelson | May 8, 1962 |